Aug. 2, 1960   J. R. PERRY   2,947,176
ACCELEROMETERS
Filed Oct. 4, 1957
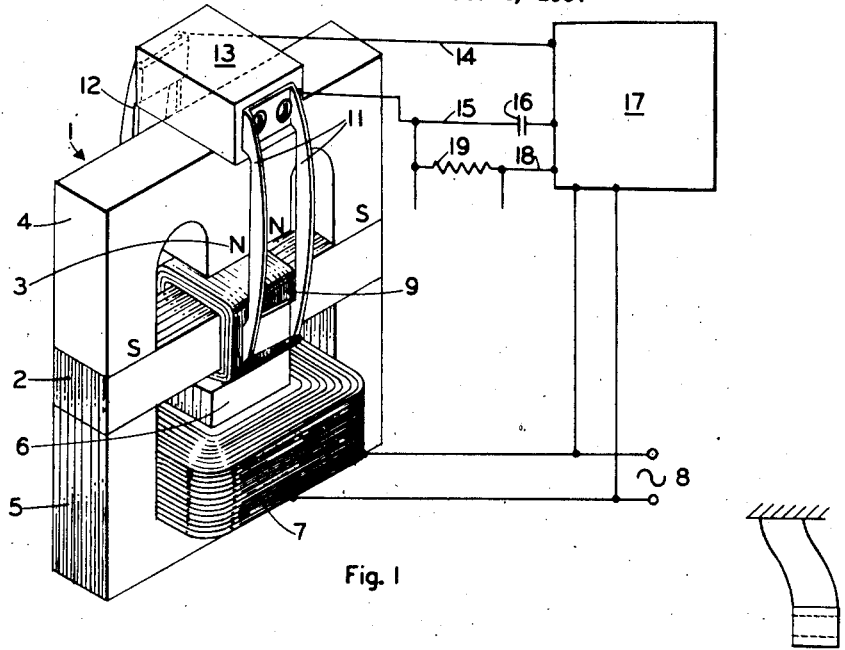
Fig. 1
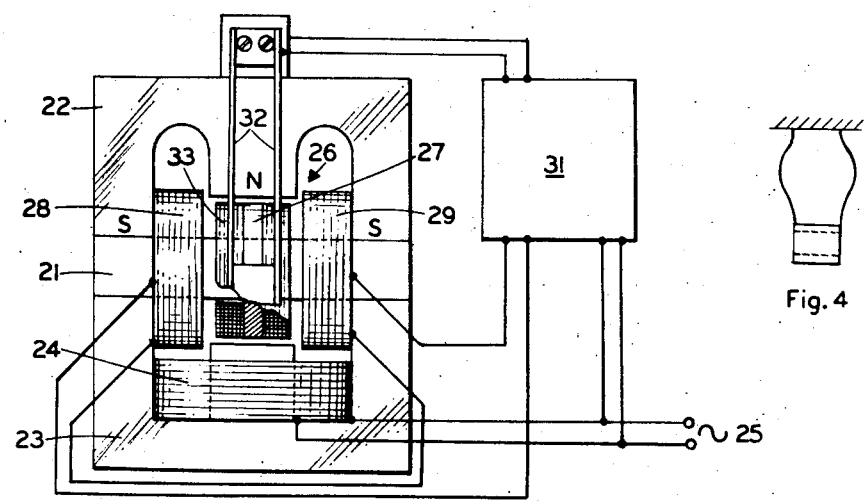
Fig. 2
Fig. 3
Fig. 4
Inventor:
John R. Perry
by Richard E. Horley
His Attorney

2,947,176

ACCELEROMETERS

John R. Perry, Peabody, Mass., assignor to General Electric Company, a corporation of New York Filed Oct. 4, 1957, Ser. No. 688,214

5 Claims. (Cl. 73—517)

This invention relates to accelerometers and more particularly to acceleration sensitive instruments in which electromagnetic forces balance acceleration forces applied to a sensing element, the electrical currents which produce the electromagnetic forces thus becoming a measure of acceleration.

The present invention is in the nature of an improvement on acceleration sensitive instruments of the type disclosed in a co-pending application of Harry C. Wendt and Clarence A. Haskell, entitled "Accelerometers," Serial No. 684,607, filed September 17, 1957, and assigned to the same assignee as that of the present invention. In the Wendt and Haskell application referred to above, which is discussed here for background purposes, there is provided an acceleration sensitive instrument in which a magnetically polarized core structure is inductively influenced by a solenoidal winding excited by alternating currents to superpose a geometrically coincident alternating magnetic field on the unidirectional field set up by the core. Immediately adjacent the core structure in the resultant magnetic fields a deflectable winding is mounted to be displaced by acceleration forces from a normal position in which the net inductive coupling between it and the alternating field is zero to positions having varying degrees of coupling varying with acceleration. Movement of the deflectable winding due to acceleration causes an alternating current signal to be induced in the winding. Remotely positioned telemetering means connected to receive the alternating current signal produces a direct current signal. The direct current signal derived from the telemetering means is applied directly across the deflectable winding, causing it to set up a unidirectional magnetic field reacting with the unidirectional field supplied by the core structure. The direction of the direct currents in the deflectable winding is chosen to urge the winding back toward its normal position, until a condition of balance is reached between the deflecting acceleration force on the one hand, and the restoring electromagnetic force on the other hand. The direct current signal so produced thus becomes a measure of acceleration. The acceleration detector portion of such an instrument combining, as it does, the properties of a pickoff and a torque motor, may be constructed very compactly and still maintain a high degree of sensitivity, as well as a wide range of usable response.

A significant advantage of the accelerometers disclosed in the aforementioned application lay in the fact that a single movable element performed the functions of a pickoff and a motor. In most cases, it is desirable to employ a permanent magnet, because of its obvious superiority to other means for producing the same result, for the establishment of the uniform field required by the instrument. It is familiar klowledge that presently known permanent magnetic materials have in general a high relectance to externally applied magnetic fields, as well as high hysteresis and eddy current losses. These factors impose undesirable practical limitations on the alternating field which can be superposed on permanent magnet core. Furthermore, an alternating magnetic field forced through a permanent magnetic material could cause serious deterioration in the pole strength of the magnet.

It is an object of this invention therefore to provide an accelerometer having a permanent magnetic field-producing core structure and a single movable element performing the function of a pickoff and a motor without the necessity of forcing an alternating magnetic field through the permanent magnet.

According to the present teachings, accelerometers of the type described above are provided with two distinct magnetic circuits which have a common or at least co-extensive portion. In one of these circuits the undirectional magnetic flux is established and in the other, the alternat;ng fluxes. These separate magnetic fluxes are brought together in the common portion of their circuits to exercise their respective influences, in one embodiment, upon a deflectable winding extending both into the unidirectional field and into the alternating field. Acceleration-induced displacements of the deflectable winding from its normal position of zero mutual inductance relative to the alternating field cause alternating current potentials to be produced in the deflectable winding. The alternating current signal is taken off and applied to a discriminator amplifier which converts the alternating current signal into a direct current signal of a proper polarity depending upon the phasing of the original signal, the amplified direct current signal being proportional to the alternating current input signal. The direct current signal is then applied back into the same deflectable winding, creating in it a magnetic field reacting with the unidirectional field in which it is positioned, and thereby urging the deflectable winding back toward its normal position. With this construction, the unidirectional and alternating magnetic fields are each set up in an efficient manner and yet the advantages of a single movable element combining the functions of a pickoff and a motor are retained.

While the scope of this invention should not be limited except by a fair interpretation of the appended claims, further details of the invention, as well as additional objects and advantages may be better understood in connection with the accompanying drawings, wherein:

Figure 1 is a partly schematic, partly pictorial view of an ecceleration-sensitive instrument constructed in accordance with these teachings;

Figure 2 is a plan view, partially cut away, of an alternative construction of an acceleration-sensitive instrument according to this disclosure; and, Figures 3 and 4 are exaggerated representations of the types of flexure to which leaf springs may be subjected, included for explanatory purposes.

In Figure 1 there is depicted an acceleration-sensitive instrument in which the primary detector means 1 is mounted separately and positioned remotely from its associated control eqiupment. The detector itself comprises an elongated ferromagnetic core structure 2 preferably laminated and formed of a suitable low-reluctance material such as soft iron. Mounted adjacent the elongated core structure 2 with one of its poles 3 facing an intermediate portion of that structure across an air gap is a permanent magnet core structure in the shape of an E. The outer legs of the E-shaped permanent magnet provide flux-return paths for the flux directed across the upper air gap. Opposite the permanent magnet core structure an additional core structure 5, preferably a low-reluctance laminated structure, also presents a pole piece 6 facing an intermediate portion of the elongated core structure across another air gap. In the lower air gap an alternating magnetic flux is set up by means of a solenoid 7 excited from a suitable source 8 of alternating current. The outer legs of the laminated E-shaped structure provide flux return paths for the alternating magnetic flux.

Mounted to encircle the central portion of the elongated core structure inductive means is in the form of a deflectable winding 9 extend through both the aforementioned air gaps, being suspended by two pairs of leaf springs 11 and 12 for deflection in either direction along the elongated core structure in response to acceleration forces. Normally, that is under conditions of zero acceleration, the winding 9 occupies a position of zero mutual inductance with respect to the alternating magnetic field, since it is positioned at a point where the alternating field separates into equal halves circulating in opposite directions through the core structure 5. Acceleration components in a direction to which the instrument is sensitive will immediately cause a deflection of the winding from its normal position resulting in its becoming linked with varying amounts of the alternating magnetic flux set up in the lower air gap. A net periodically varying signal will thereby be induced in the deflectable winding. In the preferred construction shown each pair of leaf springs has a terminal portion cemented to the surface of the deflectable winding and opposite ends of the winding are connected electrically through these terminal portions to respective pairs of leaf springs. To conduct the alternating current signal from the deflectable winding, the leaf springs should therefore be insulated one from another and for this purpose the support block 13 is formed of an insulating material cemented to the upper surface of the permanent magnetic portion of the core structure. The alternating current signal is taken off through conductors 14 and 15 and supplied through a blocking condenser 16 to a discriminator amplifier 17. Discrimination is with respect to a reference signal from the same source 8 which energizes the excitation winding 7.

The output signal of the discriminator amplifier 17 is a well-filtered direct current signal, the polarity and magnitude of which depend upon the phasing and amplitude of the input signal. The direct current output signal is applied over conductors 14 and 18 back to the deflectable winding causing it to set up a unidirectional field reacting with the unidirectional field in the upper air gap in which it is positioned. The direction of current flow is chosen such that the reacting unidirectional fields urge the deflectable winding 9 back toward its normal position of zero mutual inductance. A condition of equilibrium is reached when the winding deflection is such as to produce a restoring electromagnetic force exactly balancing the force applied to the deflectable winding by the acceleration under measurement. When this condition is reached, the direct current excitation signal in the deflectable winding is a measure of the acceleration and may be used directly in any of several methods not important to this invention to control an indicator or system responsive to accelerations. In the example shown, the direct current signal is passed through a resistor 19 preferably having a precise temperature-compensated resistance. The potential across the resistor is therefore proportional to acceleration and is easily applied to govern either indicating or control equipment as desired.

It is to be observed that the deflectable inductive means, which in this instance comprises merely a movable coil, is responsible for the pickoff and restoring force motor functions. Because this winding extends into both the unidirectional field and the alternating magnetic field, it reacts with and is acted upon by both of them. This feature permits a very compact arrangement to exhibit a high degree of sensitivity and a wide range of usable response. In addition, by the construction shown the alternating magnetic fields are not required to be forced through a permanent magnetic core structure with the consequence that good pickoff sensitivity is obtained without wasting energy or generating excessive heat. Also, the possibility of damage to the pole strength of the magnet is minimized. The leaf spring arrangement suspending the deflectable winding also possesses additional advantages which will be described below.

The alternative arrangement shown in Figure 2 embodies many of the structural features shown in Figure 1 and operates in a generally similar manner. That is, the section 21 of the core structure which defines an elongated flux path is subjected at an intermediate portion to a unidirectional field set up by the permanently magnetized section 22 of the core structure across an air gap and to an alternating magnetic field set up in the lower section 23 of the core structure. For the latter purpose, the excitation winding 24 is provided as before with alternating current excitation signals from source 25. In this version the combined purpose inductive means includes deflectable current conductors 26 with a shorted turn or flux barrier 27 incorporated into it as well as matched pickoff coils 28, 29, positioned on the elongated core structure 21. When the deflectable conductors are centered, the alternating flux is distributed symmetrically in the elongated core structure 21 and in the symmetrical flux return paths, and equal voltages will be induced in the two pickoff coils. These coils are connected electrically in series opposition so that no net signal results in this condition. The particular conductors constituting the shorted turn or flux barrier, however, tend to oppose alternating fluxes flowing therethrough. Therefore, when the deflectable conductors are displaced from their normal position of zero mutual inductance by acceleration forces, the flux barrier divides the alternating flux unevenly between the two ends of the elongated core structure. Unequal voltages are then induced in the two pickoff coils 28 and 29 and a net signal results of a phase corresponding to the direction of departure of the conductors from their null position. This alternating current signal is supplied as before to the discriminator amplifier 31 whose direct current output signal has a polarity and a magnitude varying with the phasing and amplitude of the input signal. The direct current output signal is again supplied through leaf springs 32 to the winding 33 forming a part of the deflectable conductors. The field set up by winding 33, reacting with the unidirectional field supplied in the upper air gap by the permanent magnetic core structure 22, urges the deflectable inductive means back toward its null position. When a condition of balance is reached, the output signal of the amplifier 31 then becomes a measure of acceleration.

This alternative arrangement, although necessitating the employment of additional pickoff windings, has the advantage of keeping the amplifier input and output electrically separated allowing more freedom in the amplifier design. This advantage is achieved nevertheless with but a single composite deflectable conductive means. Furthermore, in conjunction with the field of the permanent magnet the shorted turn or flux barrier provides useful damping of the coil motion, where that is desirable, reducing oscillatory motions of the coil not characterizing the information sought. The shorted turn effect may be achieved in alternative ways. The deflectable winding may be wound on top of the shorted turn, using the turn as a coil form. Alternatively, a similar effect can be obtained simply by electrically loading the deflectable winding by permitting it to draw current through a shunting resistor.

In each of the embodiments shown, the effect of feeding the direct current output of the amplifier back through the deflectable conductors where it reacts with the permanent magnet field to cause a restoring force on the coil is the electrical equivalent of a mechanical spring restraining displacement of the deflectable conductors. There is some actual mechanical spring effect present also due to the flexure suspension. It is desirable to have the stiffness of the electrical spring large compared to the mechanical spring stiffness along the sensitive axis in order to minimize certain transient acceleration errors.

The direct current output of the amplifier in each of the instances shown should be well filtered to remove alternating current components of the same frequency as the input signal which might otherwise be fed back into the input of the amplifier and cause instability. If an excitation current of a high audio frequency is used, filtering can be easily accomplished without introducing large time constants into the system which would impair response to high frequency acceleration input components. The utilization of much higher frequencies would tend to make lead handling critical, increasing susceptibility to stray capacitive effects.

The particular leaf spring configuration shown in both embodiments also possesses certain advantages desirable in sensitive instruments of this type. Normal flexure of the parallel leaf springs should be similar to the S mode shown in an exaggerated form in Figure 3 wherein the bending in the leaf spring occurs principally in the end portions. This would permit movement of the deflectable conductors in the direction in which it is desired to measure acceleration forces and restrain its movement in other directions. Accelerations perpendicular to the principal axis of deflection of the conductors could cause buckling flexures of the type shown in Figure 4 where much of the bending occurs in the center part of each leaf spring. Since the clearances in the air gaps in which the deflectable conductors are positioned are preferably as small as possible, buckling flexures of the latter type might cause the deflectable conductors to touch the surrounding core structure and introduce thereby another source of error. Another potential source of trouble in leaf spring suspensions is at the end points where minute relative motions may occur causing friction between the spring and the fastening member. Both of these sources of potential error are minimized by the unique leaf spring construction shown in Figures 1 and 2 suspending the deflectable conductors. The resistance of the spring to buckling is increased with very little increase in the stiffness to S-bending by enlarging the spring width at its central portion as shown in Figure 1. Furthermore, since the width of the left spring is enlarged also at its ends in the vicinity of the terminal portions, the chance of minute frictional movements occurring between the leaf spring and its supports is minimized. The construction shown confines flexures of the leaf springs to regions intermediate the central and end portions where bending is desirable and reduces bending to a vanishing point in those regions where flexure might adversely affect the operation of the spring. Additionally, the advantageous shape is the product of the simplest of manufacturing operations, requiring merely simple punch and bending steps.

In addition to the alternative forms of accelerometer instrument described herein, other variations, modifications and substitutions within the scope of these teachings will doubtless occur to those skilled in the art to which this invention pertains. The examples depicted should therefore be taken as illustrative in nature and this disclosure should not necessarily be considered to be limited to the specific examples shown.

What I claim as new and desire to secure by Letters Patent of the United States is:

1. An acceleration-sensitive instrument comprising: a core structure having a first section defining an elongated flux conducting path, a second section permanently magnetized and arranged to apply a unidirectional magnetic flux to an intermediate portion of said first section across an air gap, and a third section arranged to apply fluxes to an intermediate portion of said first section across another air gap separate and spaced from the first mentioned air gap; means for circulating alternating magnetic flux in said third section and said other air gap; inductive means including electrical conductors encircling said first section of said core structure and extending through both of said air gaps; means mounting said electrical conductors for deflection longitudinally of said first section by acceleration forces from a position of zero mutual inductance relative to said alternating flux to positions of varying mutual inductance depending upon said acceleration forces, whereby acceleration induced deflections of said conductors cause periodically varying potentials to be induced in said inductive means; means connected to receive said periodically varying potentials and governed thereby for producing a direct current signal varying in magnitude with the amplitude of said periodically varying potentials; and means connected to circulate said direct current signal in at least a portion of said electrical conductors to create a magnetic field reacting with said unidirectional flux for urging said electrical conductors toward said normal position, whereby said direct current signal is a measure of said acceleration forces.

2. An acceleration-sensitive instrument comprising: an elongated ferromagnetic core structure; a permanent magnetic core structure applying unidirectional magnetic flux to an intermediate portion of said elongated core structure across an air gap; means including an additional core structure for applying alternating magnetic flux to said intermediate portion of said elongated core structure across another air gap separate and spaced from the first mentioned air gap; inductive means including electrical conductors encircling said elongated core structure and extending through both said air gaps at said intermediate portion; means mounting said electrical conductors for deflection longitudinally of said elongated core structure by acceleration forces from a normal position of zero mutual inductance relative to said alternating flux to positions of varying mutual inductance depending on said acceleration forces, whereby acceleration-induced deflections of said conductors cause periodically varying potentials to be produced in said inductive means; and means connected to receive said periodically varying potentials and governed thereby for producing direct current signals varying in magnitude and polarity with the amplitude and phasing of said periodically varying potentials; means connected to apply said direct current signals to said conductors to create a magnetic field reacting with said unidirectional flux for urging said conductors toward said normal position.

3. An acceleration-sensitive instrument comprising: a ferromagnetic core structure including a first section defining an elongated flux path, a second section permanently magnetized and arranged to apply a unidirectional magnetic flux to an intermediate portion of said first section across an air gap, and a third section arranged to apply magnetic fluxes to an intermediate portion of said first section across another air gap separate and spaced from the first mentioned air gap, said third section comprising a pair of flux-conducting legs adjacent respective end portions of said first section defining symmetrical flux return paths; means for circulating alternating magnetic flux in said third section, said other air gap, and said flux return paths; inductive means including a pair of matched pickoff windings each arranged in inductive relationship with the alternating flux in one of said flux return paths, and deflectable current-carrying conductors extending into both the aforesaid flux gaps and being subject to both said unidirectional field and said alternating field; means mounting said deflectable current-carrying conductors for deflection longitudinally of said elongated core structure by acceleration forces from a normal position of zero mutual inductance relative to said alternating flux to positions of varying mutual inductance depending on the amount of said deflection, whereby acceleration induced deflections of said current conductor cause periodically varying potentials of differing amplitudes to be produced in each of said matched pickoff windings; means electrically connecting said pickoff windings in series opposition; means connected to receive the net periodically varying potentials produced in said pickoff windings and governed thereby for producing direct current signals varying in magnitude with the amplitude of said periodically varying potentials; and means connected to circulate said direct current signals in at least a portion of said deflectable current conductors to create a magnetic field reacting with said unidirectional flux for urging said current conductors toward said normal position, whereby said direct current signals are a measure of said acceleration forces.

4. An accelerometer comprising a first magnetic circuit including a fixed permanent magnet for providing a unidirectional magnetic field, a second magnetic circuit including a fixed electromagnet spaced from the permanent magnet for providing an alternating magnetic field, a fixed flux conducting member, said permanent magnet, electromagnet, and flux conducting member being arranged relative to each other so that said flux conducting member provides a common flux return path for both the unidirectional and alternating magnetic fields and forms a pair of separate air gaps with said permanent magnet and electromagnet respectively in the respective magnetic fields, inductive means including coil means disposed in part in each of said pair of air gaps and in a position of zero mutual inductance with respect to the alternating magnetic field, and means mounting the coil means for movement along the flux conducting member to positions of varying mutual inductance with respect to said alternating magnetic field in response to acceleration of the accelerometer in a predetermined direction so as to provide acceleration induced periodically varying potentials in said induction means, said coil means being connectible to means responsve to said periodically varying potentials for providing a direct current signal to the coil means varying in magnitude with the amplitude of the periodically varying potentials to provide a magnetic field reacting with said unidirectional field for urging the coil means toward said position of zero mutual inductance and whereby said direct current signal is a measure of acceleration of the accelerometer.

5. An accelerometer comprising an E-shaped permanent magnet having a center pole and a pair of end poles of opposite polarity from said center pole, said permanent magnet providing a unidirectional flux field, an E-shaped core of magnetizable material having a center leg registering with said center pole and a pair of end legs, coil means on said core connected to a source of alternating current for providing an alternating magnetic field, a flux conducting member extending between and registering with said end legs and end poles and providing a common flux return path for both said unidirectional and alternating magnetic fields, said center pole and center leg being spaced from said flux conducting member to provide a pair of air gaps in said unidirectional and alternating magnetic fields respectively, and inductive means including coil means, said coil means being disposed in part in each of said air gaps and being mounted for acceleration induced movement along the flux conducting member between a position of zero mutual inductance with respect to said alternating magnetic field and positions of varying mutual inductance to provide periodically varying potentials in said inductive means in response to acceleration of the accelerometer, said coil means being connectible to means responsive to said periodically varying potentials for providing a direct current signal to the coil means varying in magnitude with the amplitude of the periodically varying potentials to provide a magnetic field reacting with said unidirectional field for urging the coil means toward said position of zero mutual inductance and whereby said direct current signal is a measure of acceleration of the accelerometer.

References Cited in the file of this patent

UNITED STATES PATENTS

| | | |
|---|---|---|
| 2,136,219 | Scherbatskoy | Nov. 8, 1938 |
| 2,332,994 | Draper et al. | Oct. 26, 1943 |
| 2,552,722 | King | May 15, 1951 |
| 2,591,921 | Cosgriff et al. | Apr. 8, 1952 |
| 2,814,768 | Kinkel | Nov. 26, 1957 |

FOREIGN PATENTS

| | | |
|---|---|---|
| 759,585 | Great Britain | Oct. 24, 1956 |